Sept. 6, 1932.  A. E. RIEMENSCHNEIDER  1,876,169
LAWN MOWER
Filed May 22, 1929   3 Sheets-Sheet 2
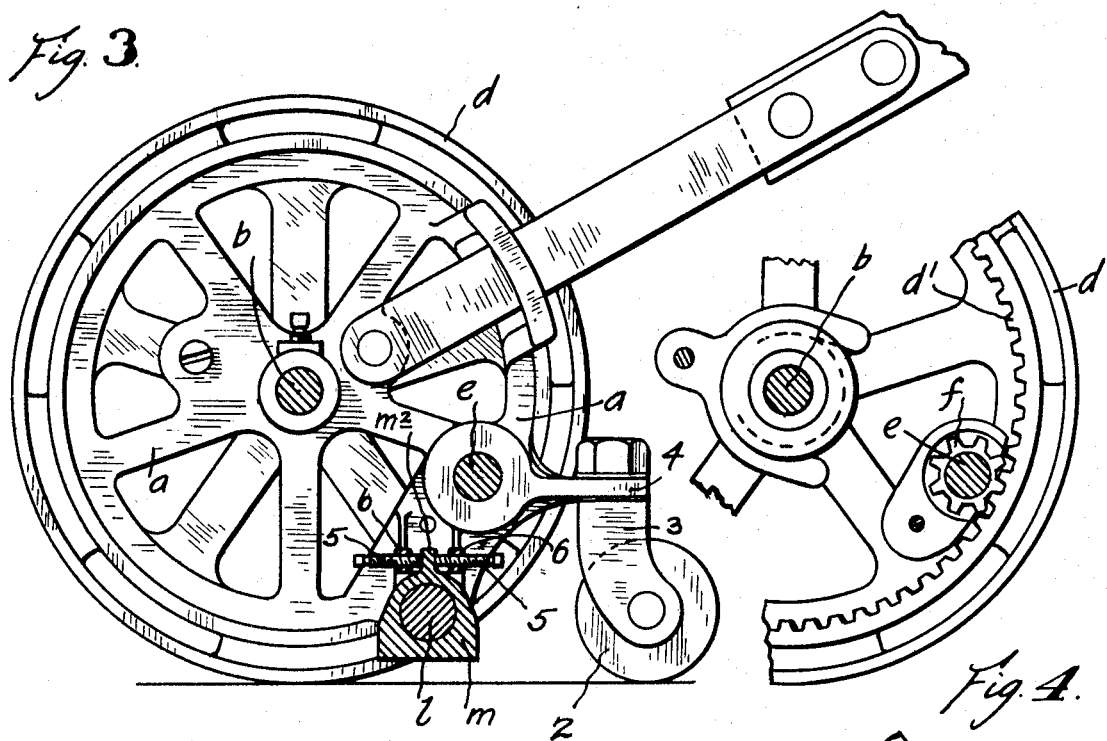
Fig. 3.
Fig. 4.
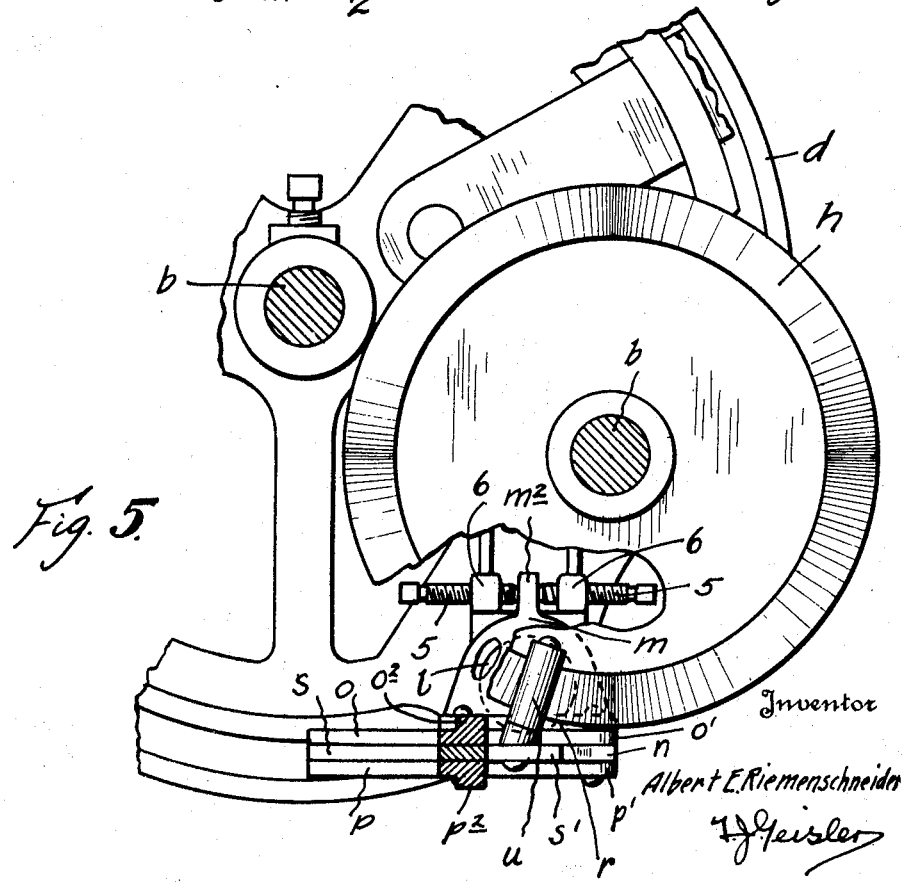
Fig. 5.
Inventor
Albert E. Riemenschneider
Attorney Sept. 6, 1932.  A. E. RIEMENSCHNEIDER  1,876,169
LAWN MOWER
Filed May 22, 1929   3 Sheets-Sheet 3
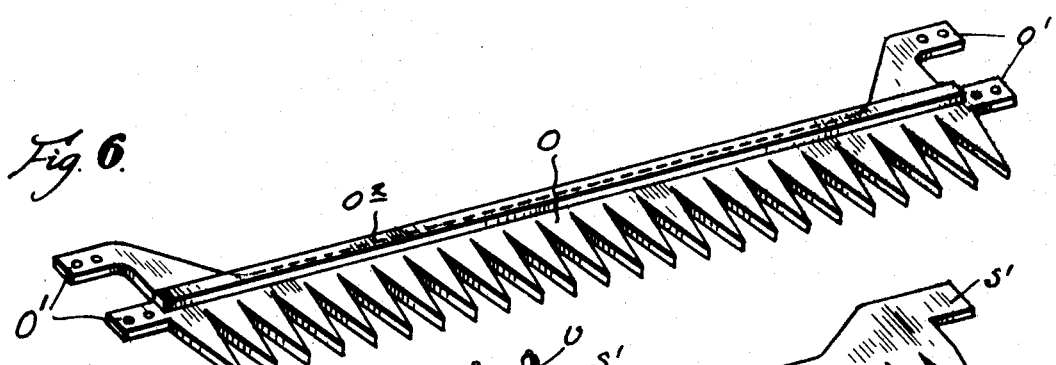
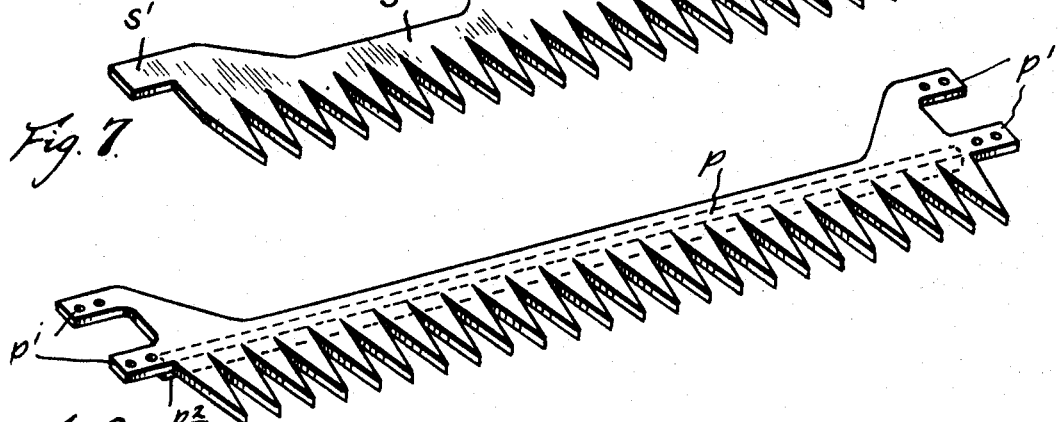
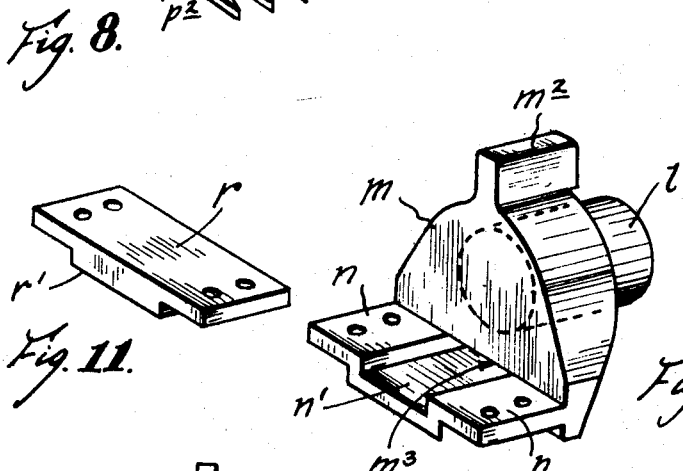
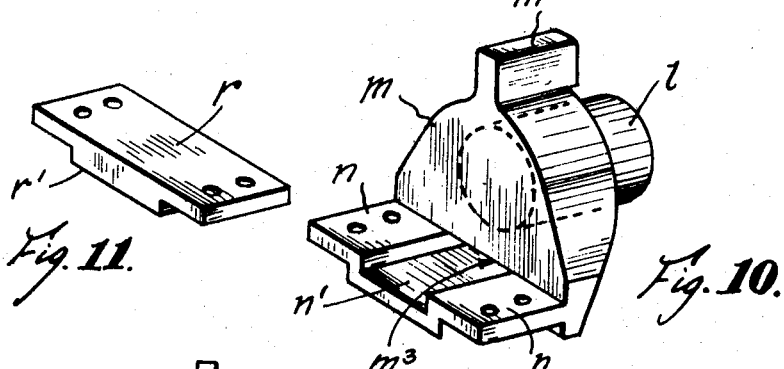
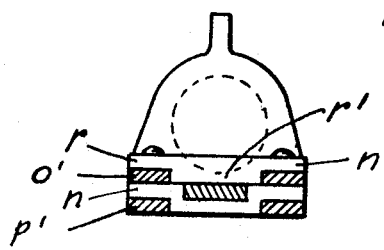
Inventor
Albert E. Riemenschneider
By F. Geisler
Attorney Patented Sept. 6, 1932

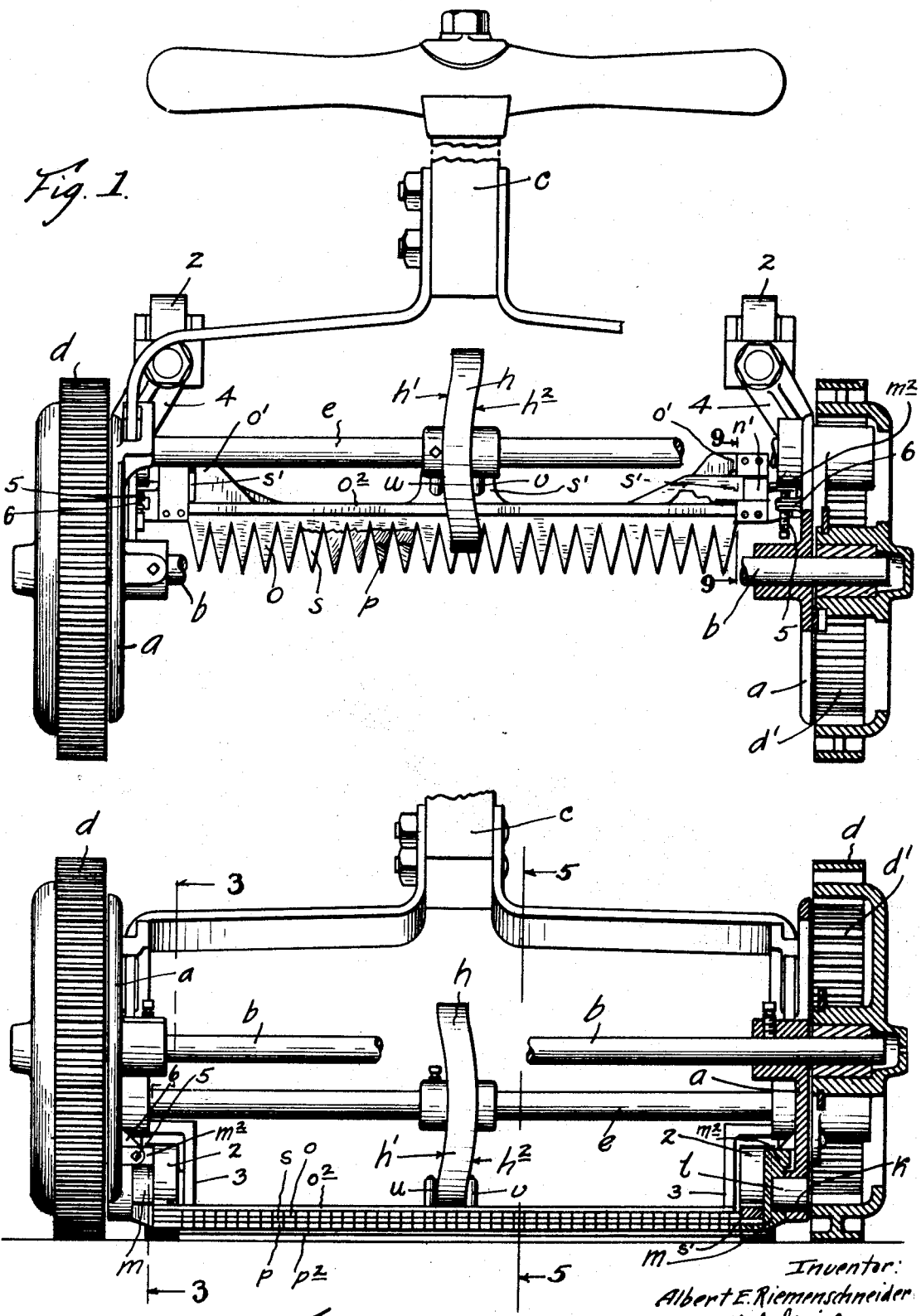

1,876,169

UNITED STATES PATENT OFFICE

ALBERT E. RIEMENSCHNEIDER, OF PORTLAND, OREGON

LAWN MOWER

Application filed May 22, 1929. Serial No. 365,029.

My invention relates to lawn mowers and particularly to the type of lawn mower provided with serrated, reciprocated cutting blades.

Heretofore lawn mowers of the kind provided with serrated reciprocating blades similar to those provided on hay mowing machines and the like have all, within my knowledge, had the defect that the points of the serrated segments of the blades tend to dig into the ground when the lawn mower is pushed over an uneven spot or an upward slope, because the said blades have been arranged in front of the driving ground wheels of the mower and thus strike any change in the level of the ground ahead of the ground wheels of the machine. Further, because lawn grass is generally quite flexible and the blades of grass are relatively thin, this type of serrated reciprocable blade has not been successfully used for lawn mowers.

Therefore, the object of my invention is to provide a lawn mower preferably driven by hand power and provided with transversely arranged serrated reciprocating cutting blades located to the rear of the vertical plane of the axis of rotation of the driving ground wheels whereby the pointed segments of the serrated blade will not be projected into the ground when the mower is driven over a rising slope of the lawn or over an uneven place, since, by locating the serrated blades to the rear of the ground wheels, the blades will be lifted in conformance with the lay of the ground by the ground wheels as they will precede the blades and guide them accordingly.

Another object of my invention is to provide a simple and practical lawn mower adapted to cut all heights of grass evenly and close to the ground. This the conventional rotary blade lawn mower can not do, as grass of greater height than the axis of rotation of the blades is not caught by the rotating blades but merely pushed over and remains uncut.

A further object of my invention is to provide a pair of stationary serrated blades, with the reciprocable cutting blade arranged between and only separated from the former sufficiently to permit the free movement of the reciprocated blade between them whereby the tenderest and most flexible lawn grass will be cut evenly and efficiently.

A still further object of my invention is to provide the combination of serrated cutting blades and driving connections therefore adapted to be substituted on any of the present rotary blade lawn mowers in present use with but slight change in the latter.

I attain my objects in a lawn mower, including a frame, driving ground wheel journaled on said frame, a shaft driven by the rotation of said ground wheels and stationary companion spaced serrated blades carried by said frame, said blades arranged parallel with, and to the rear of the vertical plane of the axis of rotation of said ground wheels, means for securing said blades to the mower, a complementary serrated blade arranged between said stationary blades and adapted for longitudinal reciprocation therebetween, a driving connection between said ground wheels and said complementary blade for reciprocating the latter comprising a cam disc fast on the driving shaft of said mower, the cam disc provided with complementary cam surfaces on each side and cam rollers carried by the said complementary blade bearing on the cam surfaces of said cam disc, ground rollers carried by the frame in the rear of said blades and means for adjusting the horizontal angle of said blades.

These and other incidental features of my invention, the details of construction, and the mode of operation are hereinafter fully described with reference to the accompanying drawings.

In the drawings:

Fig. 1 shows a top plan view of my lawn mower partly in section and illustrates the details of construction;

Fig. 2 shows a front view of my lawn mower partly in section and illustrates further details of construction;

Fig. 3 shows a section taken on the line 3—3 of Fig. 2;

Fig. 4 shows a fragmentary section of one of the ground wheels and illustrates the driving connection thereto;

Fig. 5 shows a section taken on the line

5—5 of Fig. 2 and illustrates the means provided for reciprocating the blade;

Figs. 6, and 8 show respectively the upper and lower companion stationary blades removed from the mower.

Fig. 7 shows similarly the reciprocable complementary blade;

Fig. 9 shows a section taken on the line 9—9 of Fig. 1;

Fig. 10 shows in a perspective view one of the blade holding elements removed from the lawn mower; and Fig. 11 shows one of the plates provided for securing the blades to the holding elements.

Referring now to the figures: My invention comprises a frame of the conventional type of hand propelled lawn mower, the frame comprising side members $a$, a connecting bar $b$ and a handle $c$. On each end of the bar $b$, which is projected through the side members $a$, are journaled driving ground wheels $d$ adjacent to the outer sides of the members $a$. The inner circumferences of the ground wheels $d$ are provided with gear teeth $d'$. Journaled in the side members $a$ adjacent the plane of the internal gear teeth of the ground wheels $b$ is a transverse driven shaft $e$, the ends of which project through the member $a$ and are provided on their external ends with pinions $f$, see Fig. 4, meshing with the internal gear teeth $d'$ of the ground wheels $d$.

A cam disc $h$ is mounted fast on the shaft $e$ adjacent its middle point and comprises complementary cam surfaces $h'$ and $h2$ on the sides, respectively.

Holes $k$ are provided in the lower portion of the members $a$ located to the rear of the vertical plane of the axis of rotation of the ground wheels $d$, in which the trunnions 1 of blade holding members $m$ are inserted. The blade holding members $m$ are provided with lateral plane flanges $n$ projected inwardly and adapted to be arranged in a more or less horizontal plane. The flanges $n$ are also provided with a central transverse recess $n'$.

Stationary serrated blades $o, p$ provided with bifurcated extensions $o', p'$ on each end are secured respectively to the upper and lower surfaces of the flanges $n$ by suitable bolts insertable through holes provided in the said extensions $o', p'$, and through a plate $r$ arranged over the extensions $o'$ forming a cover for the recess $n'$ between the ends of the blade. A reciprocable serrated blade $s$ is arranged between the blades $o, p$, which is provided with end extensions $s'$ projecting into the said recesses $n'$.

The space between the blades $o, p$ is such as to permit the free movement of the blade $s$ between them but to provide for the close registration of the serrated cutting edges of the former with the latter. The recess $n'$ is projected through the blade holding element $m$ as at $m3$, so that the said recess will be self-cleaned by the reciprocating movement of the blade $s$.

The blade $s$ is also formed with a lateral enlargement $s'$ on its rear edge adjacent its middle point on which perpendicular cam rollers $u, v$ are provided, adapted and arranged to bear on each side of the said cam disc $h$.

Ground rollers 2 are provided, carried by brackets 3 connected to arms 4, integral with and projecting rearwardly from the side members $a$.

The blades $o, p$ are provided with stiffening ribs $o2, p2$ on the upper and lower surfaces, respectively, and the blade holding members $m$ are provided with transverse ribs $m2$ on the upper part, on each side of which adjusting set screws 5 bear, which are threaded in lugs 6 integral with the members $a$. In this way the cutting edges of the knives may be elevated to vary the height at which the grass is to be cut.

By this construction the rotating of the ground wheels $d$ as the lawn mower is pushed over the ground will rotate the shaft $e$ through the pinion $f$ and the cam disc $h$, the complementary cam surfaces of which bear against the cam rollers $u, v$ on the reciprocable blade $s$ and cause the said blade to be reciprocated between the stationary blades $o, p$.

Thus the blades $o, p, s$ will follow the ground wheels $d$ and be guided in conformity with the lay of the ground and will not dig into the lawn.

I claim:

1. In a lawn mower the combination of a frame, ground wheels journaled at the sides of the frame, a stationary serrated blade and a complementary longitudinally reciprocable blade, said blades arranged parallel with and to the rear of the axis of rotation of said ground wheels and supported at each end on tiltable brackets carried by said frame, means carried by said frame adapted to hold said brackets in adjusted position relatively to the ground, and a driving connection between said ground wheels and said complementary blade for reciprocating the latter.

2. In a lawn mower the combination of a frame, ground wheels journaled at the sides of the frame, a stationary serrated blade and a complementary longitudinally reciprocable blade, said blades arranged parallel with and to the rear of the axis of rotation of said ground wheels and supported at each end on tiltable brackets carried by said frame, set screws carried by said frame and bearing on opposite sides of a web of said brackets adapted to hold said brackets in adjusted position relatively to the ground, and a driving connection between said ground wheels and said complementary blade for reciprocating the latter.

3. In a lawn mower the combination of a frame, ground wheels journaled at the sides of the frame, stationary, companion spaced serrated blades and a complementary longitudinally reciprocable blade arranged between said stationary blades, said blades arranged parallel with and to the rear of the axis of rotation of said ground wheels and supported at each end on tiltable brackets carried by said frame, means carried by said frame adapted to hold said brackets in adjusted position relatively to the ground, and a driving connection between said ground wheels and said complementary blade for reciprocating the latter.

4. In a lawn mower the combination of a frame, ground wheels journaled at the sides of the frame, stationary companion spaced serrated blades and a complementary longitudinally reciprocable blade arranged between said stationary blades, said blades arranged parallel with and to the rear of the axis of rotation of said ground wheels and supported at each end on tiltable brackets carried by said frame, set screws carried by said frame and bearing on opposite sides of a web of said brackets, adapted to hold said brackets in adjusted position relatively to the ground, and a driving connection between said ground wheels and said complementary blade for reciprocating the latter.

ALBERT E. RIEMENSCHNEIDER.